Fig 3B

Aug. 28, 1956  E. A. WILCKENS ET AL  2,760,315
ARTICLE HANDLING AND COUNTING APPARATUS
Filed July 2, 1951  9 Sheets-Sheet 6

Fig 4.

INVENTORS
EIBE A. WILCKENS
WILLIAM W. ACKERMAN
BY Cushman, Darby & Cushman
ATTORNEY Aug. 28, 1956     E. A. WILCKENS ET AL     2,760,315
ARTICLE HANDLING AND COUNTING APPARATUS
Filed July 2, 1951     9 Sheets-Sheet 9

INVENTORS
Eibe A. Wilckens
William W. Ackerman
BY Cushman, Darby & Cushman
ATTORNEYS

United States Patent Office 2,760,315
Patented Aug. 28, 1956

2,760,315

ARTICLE HANDLING AND COUNTING APPARATUS

Eibe A. Wilckens and William W. Ackerman, Baltimore, Md., assignors to Crown Cork & Seal Company, Inc., Baltimore, Md., a corporation of New York Application July 2, 1951, Serial No. 234,872

9 Claims. (Cl. 53—59)

The present invention relates to article handling and particularly to apparatus for directing a counted number of articles to a shipping receptacle or the like and including means for insuring that a loose mass of articles is properly settled within the receptacle.

In the manufacture of numerous types of articles it is desirable that a predetermined number of articles be packed in shipping receptacles and also that the articles be counted automatically as they move to the receptacle. In the packing of a number of small light weight articles it is likewise desirable that the articles be firmly settled in the receptacles so that the latter need be no larger than its rated capacity, thereby avoiding having articles in a loose condition in the receptacle and also reducing unnecessary costs in receptacles.

The principal object of the present invention is to provide apparatus which will fulfill the above requirements; that is, will automatically direct a proper number of articles to a shipping or packing receptacle, the invention also including arrangements for firmly settling the articles in the receptacles.

While the invention is applicable to the handling of numerous types of articles, in the embodiment shown in the accompanying drawings the apparatus which is illustrated is particularly adapted for handling container caps of the crown type. For convenience in the description of the apparatus the articles handled will, therefore, be frequently referred to as caps.

It is a further object of this invention to provide apparatus for article handling wherein articles are counted as they are directed into one receptacle and the receptacle is periodically shaken or otherwise manipulated to settle the articles evenly in the receptacle.

It is a still further object of our invention to provide apparatus wherein articles are counted and directed into one receptacle which is periodically manipulated to settle the articles and upon a predetermined count having been delivered to the one receptacle the flow of articles is diverted to another receptacle which may be similarly manipulated for settling the articles, the arrangement also comprising the further manipulation of the first receptacle after the flow of articles has been diverted to firmly settle the last entered articles in the first receptacle.

A still further object of our invention is to provide in combination apparatus for assembling articles in a flow line to be counted, guiding the articles into a first receptacle which may be intermittently vibrated or otherwise manipulated to settle the articles, each period of vibration commencing upon a predetermined count of articles, diverting the flow of articles to a second receptacle upon a predetermined count and providing a final or "hold over" manipulation of the first receptacle after the flow of articles has been diverted.

Further objects and the entire scope of the invention will become more fully apparent from the following detailed description and from the appended claims. It will be understood that the detailed description is made only for purposes of illustration and is not intended to limit the invention.

The invention may be best understood with reference to the accompanying drawings in which:

Figure 5 is a detailed view partly in section of the upper portion of the apparatus shown in Figure 1, the means for vibrating the receptacle being omitted for the purpose of clarity.

Figure 1:
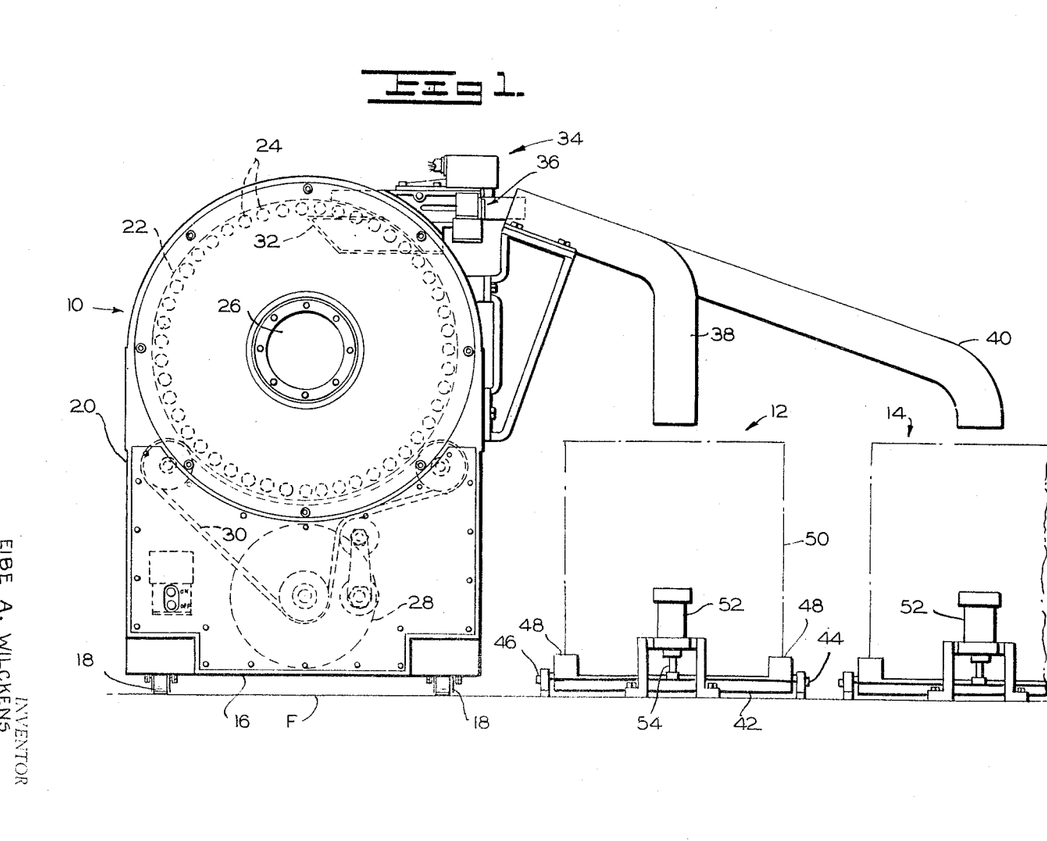
Figure 1 is a front elevational view of apparatus according to the invention including means for receiving and assembling articles for uniform flow for permitting detection of the passing articles for counting purposes, means for selectively diverting the flow of articles between two receptacles and means for vibrating the receptacles for settling articles therein.

Referring to Figure 1 the general structural arrangement of article handling, counting and shaking apparatus according to the invention is shown. The arrangement in Figure 1 includes a portably mounted handling mechanism 10 and receptacle shaking units 12 and 14 of the structure disclosed in United States Patent 2,304,982, to Wilckens.

The mechanism 10 is mounted on a base 16 which is supported above the floor F by means of rollers 18. Mounted on an upstanding framework 20 extending from the base 16 is a rotatable cap collecting hopper 22 outlined in Figure 1 by a dash line. A plurality of permanent magnets 24 are mounted for rotation with the hopper 22 and serve to attract and retain caps. The caps to be counted are introduced to the mechanism 10 through a central opening 26, this opening extending completely through the counting mechanism 10 so that caps may be introduced from either side of the mechanism. Caps introduced through opening 26 will fall to the lower part of the hopper 22 and will there be attracted and retained by the magnets 24 so that if the hopper is rotated clockwise as viewed in Figure 1 by means of a motor 28 and belting 30 the caps will move with the magnets 24 until removed therefrom by means of an ejector device 32. Thereupon the caps move in a flow line in a horizontal direction through a gate unit designated generally as 34. There is also provided adjacent the unit 34 a lamp-photocell arrangement designated generally as 36 which is so positioned that the caps issuing from the magnets interrupt the light path once for every cap.

The caps proceed from the unit 34 into chutes 38 and 40 which direct the caps into receptacles at receptacle holding units 12 and 14, respectively. Operation of the gate at unit 34 determines whether the flow of caps is through chute 38 or chute 40. The arrangement is such that upon a predetermined count by electronic apparatus connected with the lamp-photocell unit 36 the gate of unit 34 will shift the flow of caps from one chute to the other.

The receptacle holding units 12 and 14 may be identical in all respects and further description will be made only of unit 12. This unit comprises a base 42 mounted for rocking movement about stub shafts 44 and 46. Extending upwardly from the base 42 are corner angle members 48 which serve to retain a carton of similar receptacle 50 as shown in chain lines in Figure 1. Adjacent the forward end of the base 42 there is provided a pneumatically operated shaking device 52 having an extended operating rod 54 connected with the base 42. The arrangement is such that when air under pressure is delivered to the device 52 the operating rod 54 will be rapidly moved up and down through a short stroke to shake the carton 50. This arrangement is shown only generally in this application because further details may be fully understood from the disclosure of United States Patent 2,304,982 to Wilckens on which the present brief description is based, which disclosure is incorporated herein.

Continuing to refer to Figure 1, and assuming first that the caps are flowing through chute 38 into receptacle unit 12 the arrangement is such that upon a predetermined count which may be a sub-multiple of the total number of caps to be placed in the receptacle, the device 52 of receptacle unit 12 will be operated for a brief period to agitate the caps in the receptacle to settle them. This shaking cycle is repeated a plurality of times until a final count is obtained. At this time the gate unit 34 is energized to divert the flow of caps through chute 40 into the receptacle unit 14. However, according to a very significant aspect of the invention, the shaking function is not immediately transferred to the device 52 of receptacle unit 14. On the contrary the shaking function is retained at receptacle unit 12 to settle the last entered caps in the receptacle of unit 12. This may be conveniently termed a "shake hold-over" function. In greater detail, the rotatable hopper 22 is in the form of two dish-shaped hopper dials 22a and 22b forming the front and rear, respectively, of the hopper 22. The hopper 22 is mounted for rotation in the upstanding framework 20 in any suitable manner.

The dials 22a and 22b differ only in the construction of a rim portion at the outer periphery thereof. Referring to dial 22a the rim portion 95 is characterized by a plurality of apertures 96 in which the magnets 24 are fitted as by a press fit or the like.

The magnets 24 may be of any suitable material which may be readily magnetized and which will retain a high concentration of magnetization. Preferably these magnets will be alternately mounted as regards their N and S poles.

The rim portion 97 of dial 22b is similar in exterior shape to that of dial 22a but no provision need be made for receiving magnets. That is, it is sufficient that only one of the dials carry permanent magnets.

The hopper dials 22a and 22b are each further characterized by provision of hopper liners 98. These liners are of dish shape somewhat similar to the dials 22a and 22b. These liners may be clamped to the hubs (not shown) of the dials in any suitable manner. An outer annular area of each of the dials is characterized by being flared out at a point 404 to provide a rim area 406 which is in a plane perpendicular to the axis of rotation of the hopper dials. These rims are backed by facing edges of hopper dial rims 95 and 97. As can be clearly understood with reference to Figure 8, the inner surfaces of rims 406 of the liners 98 are spaced apart slightly more than the depth of the caps C, thus forming a channel in which the caps will lie.

The liners 98 may be made of any suitable material. Usual non-magnetic material such as brass may be employed, and it has been found that the magnetic fields of the magnets 24 are not adversely affected by use of stainless steel such as that commonly referred to as type 302 of gauge No. 22.

As previously mentioned, the hopper 22 comprising the hopper dials 22a and 22b, together with the liners 98 are driven in unison (although not necessarily in absolute synchronism) by means of the pulley belt 30 which in turn is driven by the motor 28.

To retain the caps C within the channel formed by rim areas 406 of the hopper liners 98, there is provided a cap retaining ring or arcuate strip 422. This ring extends around the hopper 22 in a position corresponding to that shown in Figure 5 except for the place where the ejector assembly 32 projects into the hopper and also at a point just "forward" of the ejector where the ring 422 diverges inwardly in a manner to be described.

As best shown in Figure 5, the ring 422 may have an outer body 424 which may be of substantial thickness to provide rigidity and the inner portion 426 of the ring may be bevelled to provide a relatively narrow inner edge 428 for retaining the caps. The edge 428 may be substantially centered between the portions 406 of liners 98 or may be positioned closer to the dial 22a side, depending on the particular configuration of the articles being handled. In the case of caps C of the crown type, the edge 428 will preferably be slightly closer to the dial 22a side inasmuch as the channel in which the caps lie is somewhat wider than the depth of the crowns to prevent binding of the caps in the channel. In view of this fact and further because the crown will be attracted as close as possible to the magnet the edge 428 must be closer to the magnet side to prevent the skirt of the cap from riding on the edge 428. As will be explained more fully below, it is also possible and permissible for caps of the crown type to come through the hopper facing in either direction. That is, the magnets 24 set up a sufficient magnetic field to attract and retain the caps no matter if the top of the cap or the skirt of the cap is facing the magnet.

The magnets 24 exert a powerful centering force on the caps and properly center them so that they will normally not rub against the edge 428 of ring 422. However, in the event that a cap for some reason is not properly centered, the ring 422 prevents centrifugal force from throwing the cap out of the hopper.

From the apparatus as thus far described, it will be apparent that whenever a supply of caps is poured into the hopper 22 through opening 26 the caps will fall to the lower portion of the hopper and eventually all of the caps by action of gravity and the agitation created by rotation of the hopper will fall into position, it being understood that the direction in which the caps face is immaterial.

Normally, by the time caps attracted to the magnets and properly in position in the cap retaining channel between liner rims 406 have proceeded upwardly into the upper left hand quadrant of the hopper as viewed in Figures 1 and 5 there will be but a single cap centered over each magnet and the other caps will have fallen downwardly into the hopper to be eventually positioned within the channel. However, due to the strong influence of the magnets, it may sometimes happen that one or more of the caps will adhere to a properly positioned cap to form a chain of caps. To break up such chains it has been found that the ring 422 may be diverged inwardly so that the inner edge 428 of the ring 422 is at a point substantially opposite the centers of the passing magnets. This point is designated 430 in Figure 5, and the position of a cap C is illustrated. By so diverging the ring 422 inwardly, the magnetic attraction of the magnets will remain sufficient to retain the caps which were substantially centered but the reduced magnetic influence will not be sufficient to maintain other caps in engagement with the first cap. However, as previously stated, there is a powerful centering action by the magnets and the first cap will immediately be repositioned over the magnets as soon as the magnet has passed the point 430 and the ring has diverged outwardly to its normal position. For various types of articles, the degree of inward divergence of ring 422 will depend upon the shape of the article.

Figure 8:
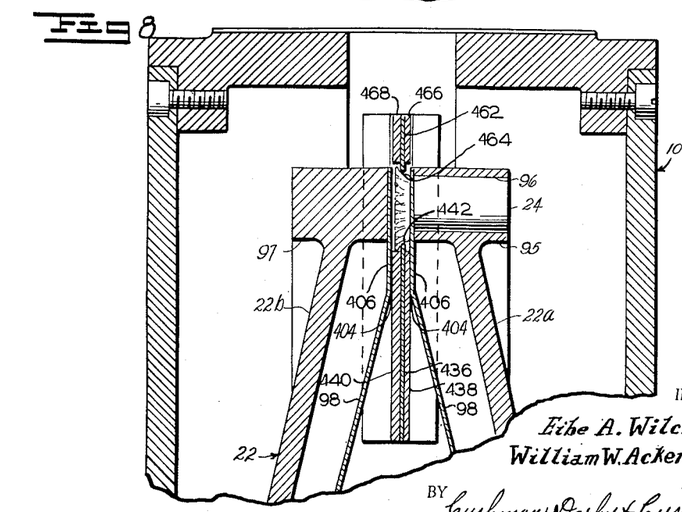
Figure 8 is a sectional view taken along the line 8—8 of Figure 5.
Figure 9:
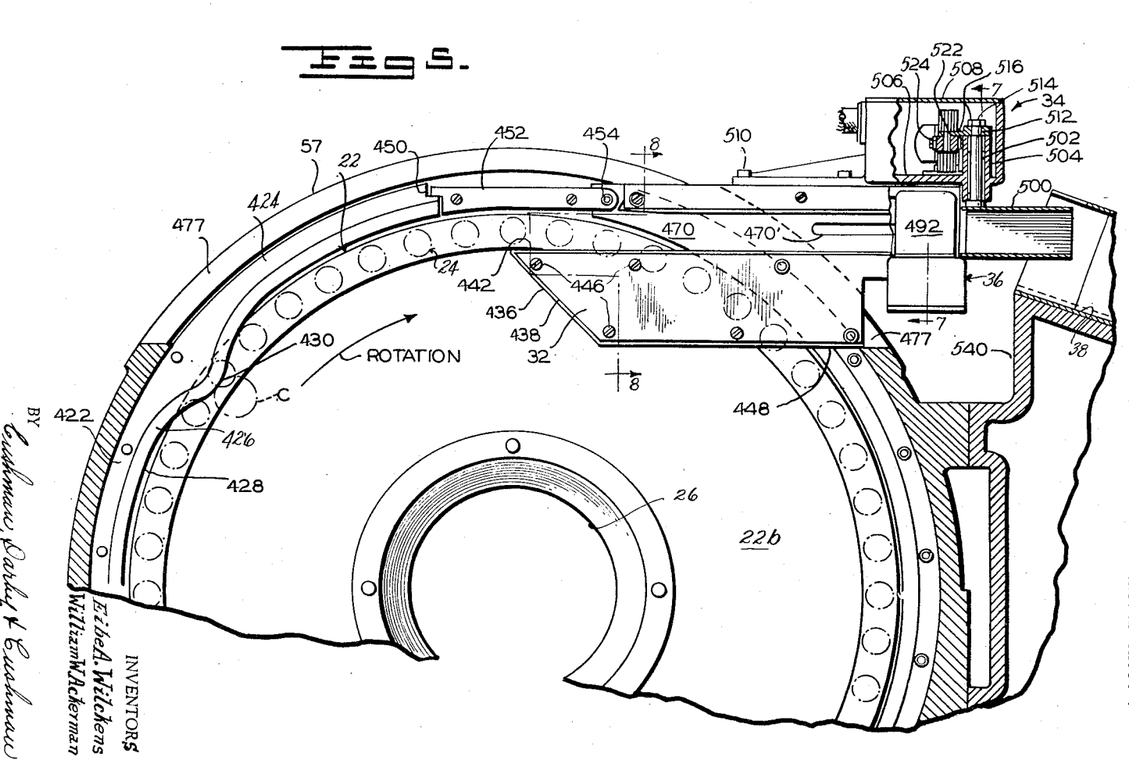

The construction and operation of the ejector assembly 32 will now be described in detail. Referring primarily to Figures 5 and 8, the ejector consists of a central relatively thin blade 436 which is supported between side plates 438 and 440. The top edge 442 of blade 436 projects slightly above the top edges of the plates 438 and 440 and top edge 442 extends horizontally and at such a point relative to the magnets 24 that the lower portion of the skirts of caps centered upon the magnets will pass immediately above plate edge 442. Therefore, as the magnets continue to move with the hopper dial 22a, a cap will ride along the edge 442 and, due to its tangential velocity, will be projected along the edge 442 in a horizontal direction to the right, as viewed in Figure 5. The position of a cap riding on the edge 442 may be best understood with reference to Figure 10.

The maximum thickness of the blade 436, together with the side plates 438 and 440, must, of course, not exceed the spacing between the inner faces of rim areas 406 of the hopper liners 98.

For purposes of illustration the positions of the magnets 24 are indicated in chain line in Figure 5.

The plates 438 and 440 of ejector 32 are secured together with the blade 436 therebetween by means of flat head screws 446.

Continuing to refer to Figures 5 and 8, the ring or strip 422 has one end at a point 448 which is below the lower edge of the ejector assembly 32 and its opposite end at a point 450 somewhat in advance of the leading end of the ejector assembly. Between the points 450 and 448 and in advance of ejector 32 there is provided a gate 452 pivotally mounted about a transverse pin 454. This gate is provided so that if a jam of caps should occur in the vicinity of the ejector 32 the gate may be opened upwardly against the bias of a suitable spring so that the jam may be cleared. The cross section of the gate 452 may be substantially the same as the cross section of ring 422 and may be further understood with reference to Figure 6, where the gate is shown as made up of a central plate 456 with side plates 458 and 460.

Just beyond gate 452 there is provided an upper guide blade or strip 462 having a lower edge 464 as shown in Figure 8 which acts in similar fashion to the upper edge 442 of ejector blade 436. Blade 462 is positioned between side plates 466 and 468. Accordingly, there is provided a horizontal channel defined by the upper edges of members 436, 438, and 440 and the lower edges of members 464, 466 and 468 for directing the caps through the previously mentioned gate unit 34. As may be best understood in Figure 7, beyond the confines of the rim areas 406 of the hopper liners 98, the sides of the channel extending into the gate unit 34 are defined by side plates 470 and 471.

Figure 6:
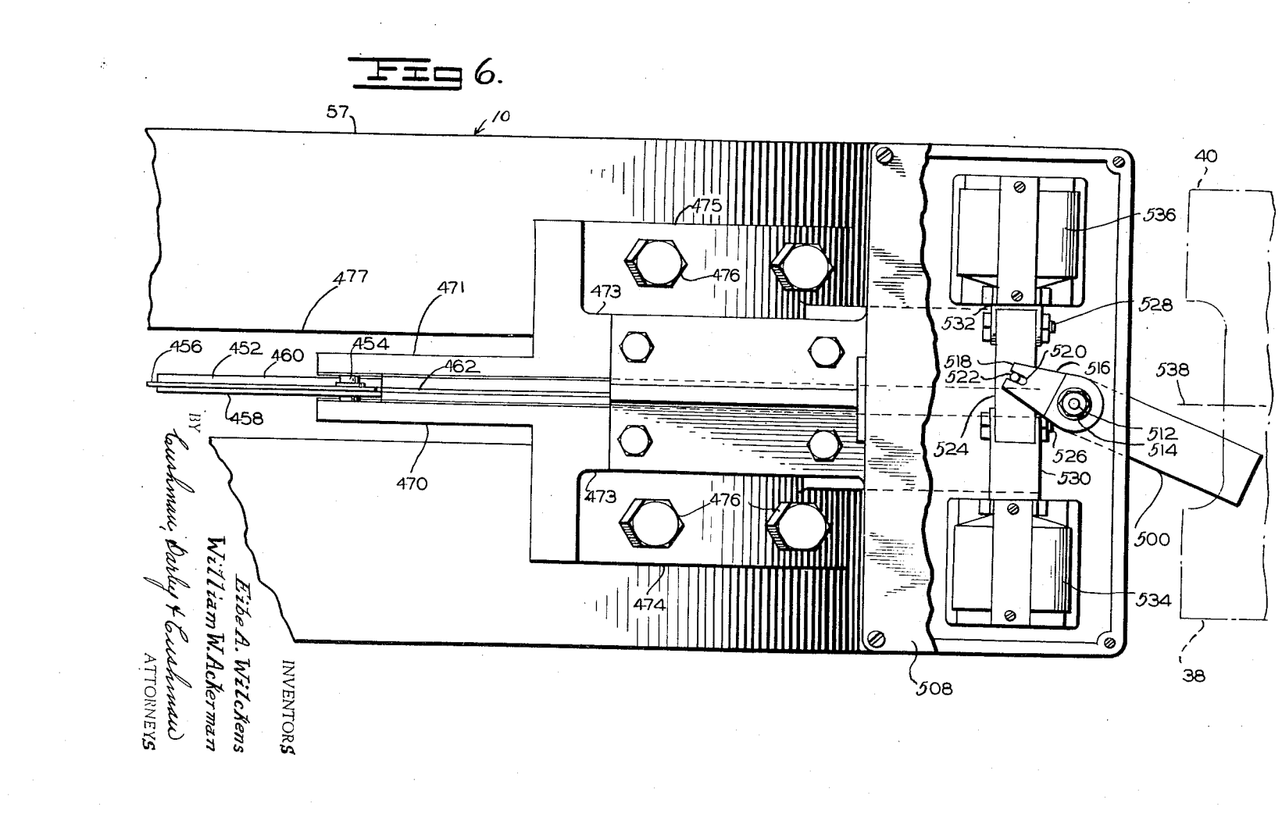
Figure 6 is a plan view of the gate unit.

Side plates 470 and 471 are in the form of C-channels having lower flanges 472 and upper flanges 473 which merge into curved side plates 474 and 475. Plates 474 and 475, best shown in Figure 6, are secured to the top 57 of frame 20 by means of bolts 476. The top 57 is provided with an elongated aperture 477 to receive the assembly defined at its extreme outer surfaces by plates 470 and 471. A suitable cover plate may be provided for aperture 477 if desired.

Figure 7:
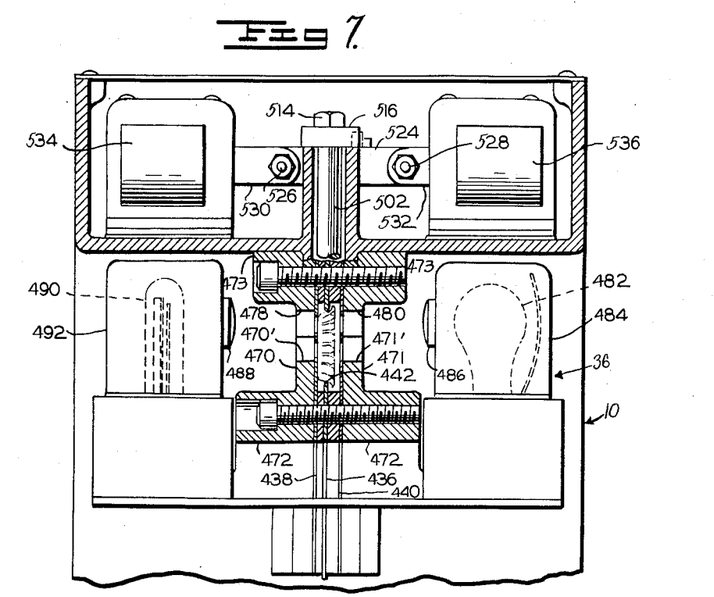
Figure 7 is a sectional view taken on the line 7—7 of Figure 5.

Referring to Figures 5 and 7, the side plates 470 and 471 are provided with elongated apertures 470' and 471' through which the operator may observe and dislodge any possible jams of caps.

As shown in Figure 7, side plates 470 and 471 are also provided with circular apertures 478 and 480, respectively, through which a beam of light may be focused. The light beam may be generated by means of lamp 482 within a suitable housing 484. A suitable lens system 486 is employed to focus a beam of light from lamp 482 through the apertures 478 and 480 to a second lens system 488 which concentrates the light of the beam on a photoelectric cell 490 within a suitable housing 492.

Accordingly, as each cap passes the openings 478 and 480 the light beam will be interrupted and this interruption may serve to actuate a counting apparatus. The electronic circuits for the particular counting apparatus will be described in detail later in the specification. Inasmuch as the apertures 478 and 480 are located above the line along which the centers of the caps will proceed it will be apparent that there will be an interruption and restoration of the light beam for the passing of every cap notwithstanding that the caps may be proceeding one immediately after another.

The gate unit 34 will now be described in detail. Referring primarily to Figures 5, 6 and 7, this unit consists of a box-like guide 500 mounted on a vertical post 502 which is mounted for pivotal movement in a bearing housing 504 which is fixedly mounted on the base 506 of solenoid housing 508.

The housing 508 is secured as by bolts 510 to the upper flanges 472 of the just described structure forming the channel through which caps pass between the lamp and photocell.

The post 502 is provided with a reduced section 512 at its upper end which is threaded at its upper extremity to receive a retaining nut 514. Surrounding the extended portion 512 of post 502 and keyed thereto is an operating arm 516 bifurcated at its end 518 remote from the post 502. The bifurcated portion designated as 520 is arranged to receive an operating stud 522 which extends upwardly from a transverse tie link 524. As best shown in Figures 6 and 7, the tie link 524 is connected by means of transverse pins 526 and 528 to the operating arms 530 and 532, respectively, of solenoids 534 and 536. Accordingly, it will be understood that upon the energization of solenoid 534 the guide box 500 will swing to direct the flow of caps into chute 40. Then upon energization of solenoid 536 the guide 500 will swing to deliver the flow of caps to the chute 38. The panels which divide the chutes 38 and 40 adjacent the gate 500 will be in line with the chain line 538 in Figure 6.

From the foregoing it will be also understood that the end of the guide box 500 adjacent the post 502 will be substantially centered over the channel between the plates 470 and 471 through which the caps proceed past the lamp-photocell arrangement. Therefore, caps issuing from the channel will be directed into the guide box 500 and will be diverted into the particular chute to which the guide 500 is directed.

The above described structural features of the mechanism 10 is disclosed and claimed in the copending patent application, Serial No. 234,871 of Eibe A. Wilckens and Charles C. Stoll, filed of even date with this application and entitled "Article Handling Apparatus."

In view of the above it will be clear that the electronic circuits associated with the light sensitive device at 36 in Figure 1 must control the diversion of flow through the chutes 38 and 40 and must also control the shaking devices 52 according to the function as set out above.

Figure 2:
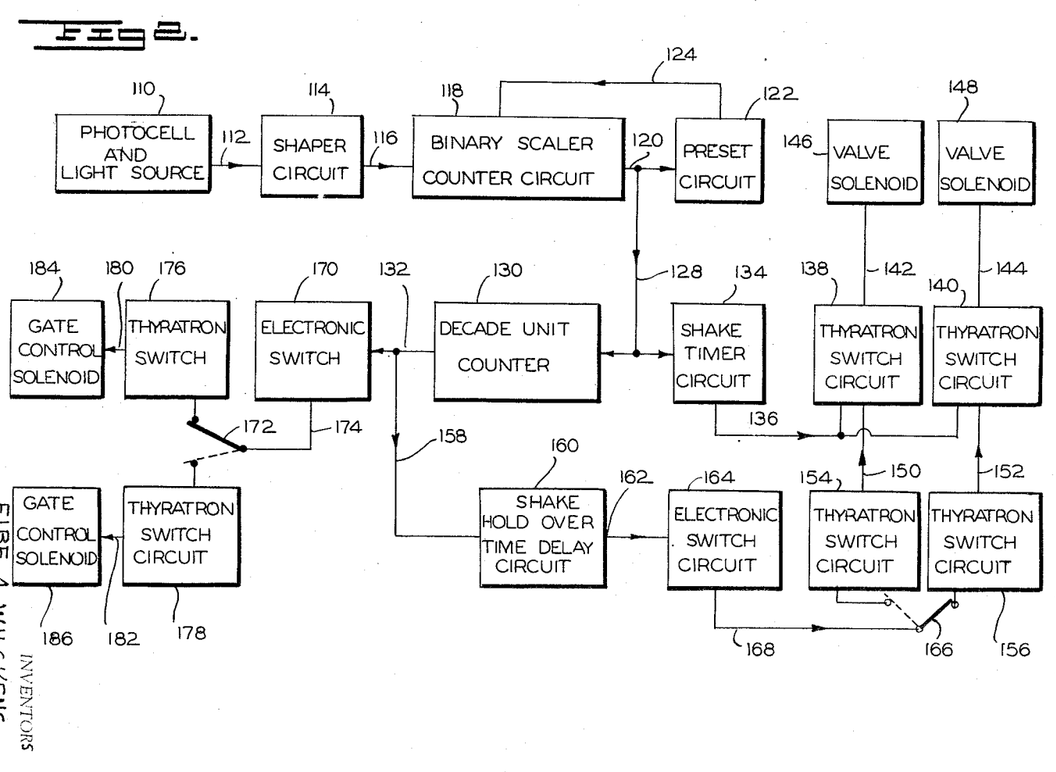
Figure 2 is a block diagram of an electronic circuit for counting the articles flowing through the apparatus of Figure 1 and for controlling the diversion of the articles between the receptacles and for controlling the vibration of the receptacles.

The electronic circuit may be generally understood with reference to Figure 2. In this figure circuit 110 comprises the photocell and light source located at 36 in Figure 1. From circuit 110 pulse-type signals representing interruption of the light beam are applied over line 112 to a pulse-shaping circuit 114. This circuit performs the function of shaping what may be a somewhat irregular pulse on line 112 into pulses of uniform duration and amplitude—one pulse for each light beam interruption— for application over a line 116 to a counting circuit 118 comprising ten binary scaler counting units.

Since in the present example ten binary scalers are employed, the total capacity of this counting circuit will be 1024 and upon reaching this count an output pulse will be available on a line 120. However, an output pulse on line 120 may be obtained for a count less than 1024 by means of a preset circuit 122 which feeds the output pulse on line 120 back over a line 124 to preset the stages of the binary scaler counting circiut 118. That is, for example, if it is desired to obtain an output pulse on line 120 upon the occurrence of only 100 counting pulses on line 116 the scaler circuit 118 is set up so that the preset pulse on line 124 will preset the scaler circuit 118 to an artificial count of 924. Therefore, 100 pulses on line 116 will bring the scaler circuit 118 to capacity. The cycle may be repeated indefinitely.

The output pulse on line 120 is also applied over a line 128 for two purposes. The first purpose is to derive a decade unit counting circuit 130. This circuit comprises four binary scaler units in series with a feedback to reduce the count from 16 to 10. Accordingly, there is available on output line 132 pulses which represent 10% of the count developed in circuit 118. In other words, assuming that the scaler circuit 118 is set to preset a count of zero, each output pulse on line 120 will represent a count of 1024 but it will take 10 of these counts applied over line 128 to produce an output pulse on line 132. Therefore the occurrence of a pulse on line 132 will represent the count of 10,240 pulses on line 116. A pulse on line 132 will similarly represent a proportional count of pulses on line 116 of whatever number is preset in circuit 118 under control of circuit 122.

The second use of pulses available over line 128 is to operate a shake timer circuit 134. Upon the occurrence of every pulse on line 128 the output line 136 is energized for a short interval of time. This interval is of desired duration for providing the previously mentioned intermittent shake of the receptacle units 12 and 14 in Figure 1. The energizing potential on line 136 is applied to the control electrodes of two thyratron switch circuits 138 and 140. The main discharge paths of the thyratron switches 138 and 140 are connected over lines 142 and 144, respectively, with the operating coils of valve solenoids 146 and 148. Compressed air or the like available under control of the valves 146 and 148 is supplied to the shaking devices 52 of receptacle units 12 and 14 (Figure 1), respectively. This connection is not shown in the drawings but it is believed to be clear from this description.

From the foregoing it will be apparent that whenever an energizing potential is available on line 136 the thyratron switch circuits 138 and 140 will both be in condition for conduction. However, the main discharge paths of the thyratron circuits 138 and 140 are also connected over lines 150 and 152, respectively, to be in the main discharge paths of two additional thyratron switch circuits 154 and 156. Therefore, current may flow in lines 142 and 144 only if both of the series connected thyratrons in each channel are enabled for conduction.

The thyratron switch circuits 154 and 156 are arranged to be alternately enabled in the following manner: The output pulses on line 132 are available over a line 158 as the input to a shake hold-over time delay circuit 160. This circuit functions in such a manner that a pulse is available over an output line 162 but only following a delay period longer than the time period of circuit 134 but less than the delay period of circuit 134 plus its expected idle period. The pulse on line 162 is then applied to an electronic switch circuit 164 and the pulse on line 162 has the effect of throwing switch 164 from one of its two possible positions to the other. This switching function is diagrammatically illustrated by switch arm 166 connected over line 168 with circuit 164. The switch arm 166 thus diagrammatically connects electronic switch 164 to enable either thyratron circuit 154 or thyratron circuit 156, depending on the position of electronic switch 164.

For reasons which will become more fully apparent below, it will be understood that the valve solenoid 146 will be energized during the existence of an energizing potential on line 136 only while thyratron switch circuit 154 is enabled by switch 164. Then, when switch 166 has energized thyratron circuit 156, valve 148 will be energized. Stated in yet other language, the thyratron switches 154 and 156 are employed to determine which valve will be operated and thyratron circuits 138 and 140 determine when the selected valve will be operated. Each set of series connected thyratrons may be considered to be in a control "channel."

The gating unit 34 (Figure 1) is also operated upon the occurrence of an output pulse on line 132 and in the following manner: The pulse on line 132 is applied to an electronic switching circuit 170. This circuit, upon the occurrence of a pulse on line 132, performs a switching operation diagrammatically illustrated by switch arm 172 connected with circuit 170 over line 174. The switch 172 determines which of two thyratron switch circuits 176 and 178 will be enabled for conduction. The outputs of thyratron circuits 176 and 178 are applied over lines 180 and 182, respectively, to gate control solenoids 184 and 186. These gate control solenoids are located in unit 34 (Figure 1) and serve to divert the flow of caps through the chutes 38 and 40.

The relationship between the diagram of Figure 2 and the apparatus of Figure 1 is that the gate solenoid 184, when energized, will divert caps through chute 38 into receptacle unit 12 and gate solenoid 186 when energized will divert caps through chute 40 into receptacle unit 14. The switch 166 will then be connected with thyratron switches 154 and 156 so that, following the movement of switch 172 to energize thyratron circuit 176 the switch 166 will move to energize thyratron circuit 156 so that valve solenoid 148, which will be connected to operate the shaking device 52 of receptacle unit 12 may be energized.

From the foregoing it will be apparent that upon the occurrence of a count on lines 120 and 128 representing 10% of the total count the carton being filled will be shaken to settle the caps. It will be first assumed that the receptacle at unit 12 is being filled. Then in due time, a pulse will appear on line 128 which will also produce an output pulse on line 132. The pulse on line 128 will serve to immediately establish an energizing potential on line 136 but at the same time the gate will be thrown to divert the flow of caps through chute 40 into the receptacle in unit 14. However, the shaking operation will be "held over" at unit 12 because of the delay established by circuit 160. Therefore, the shake established by the just mentioned pulse on line 128 will be applied at unit 12 rather than unit 14.

An illustrative example of the manner of constructing electronic circuits according to the block diagram of Figure 2 may be understood in considerable detail from Figures 3A–3C and Figure 4.

Figure 3A:
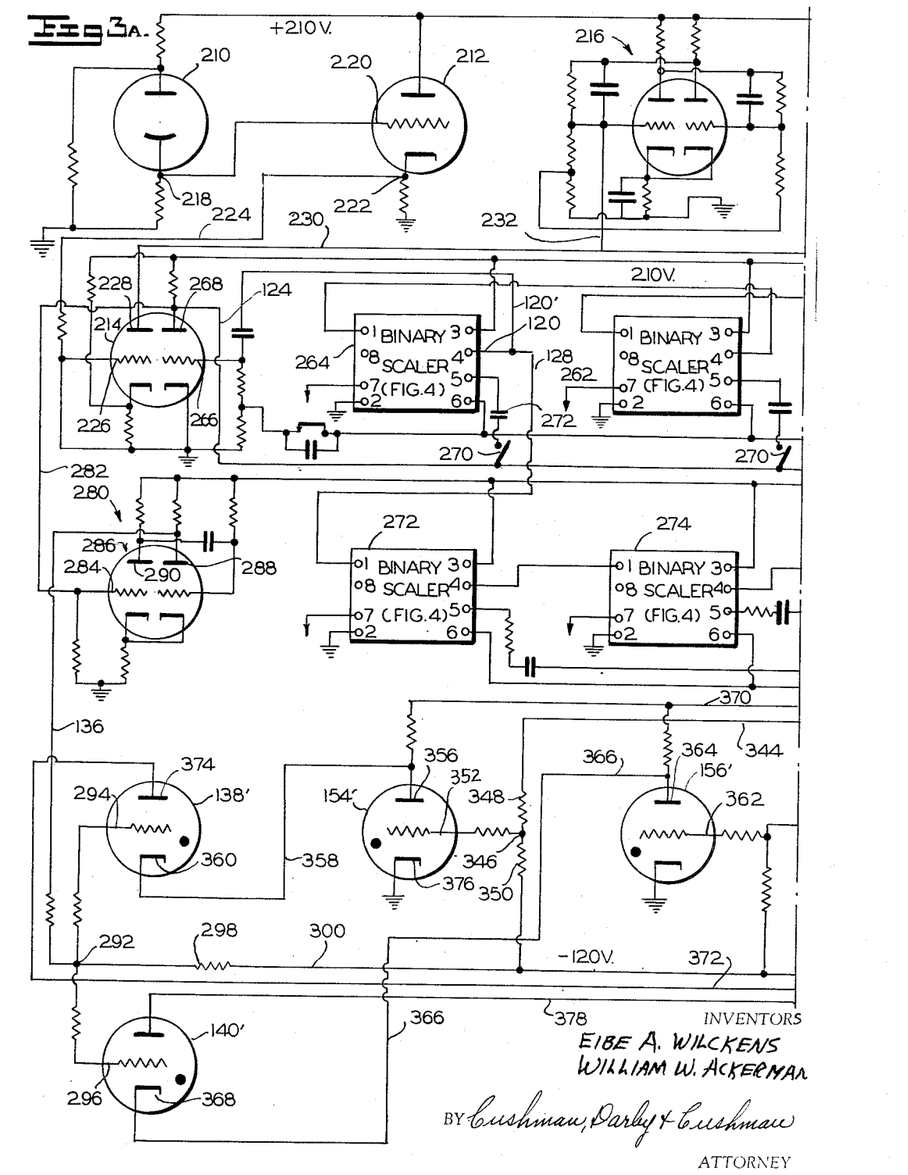
Figures 3A–3C show a schematic diagram of the electronic circuits of Figure 2.
Figure 3B:
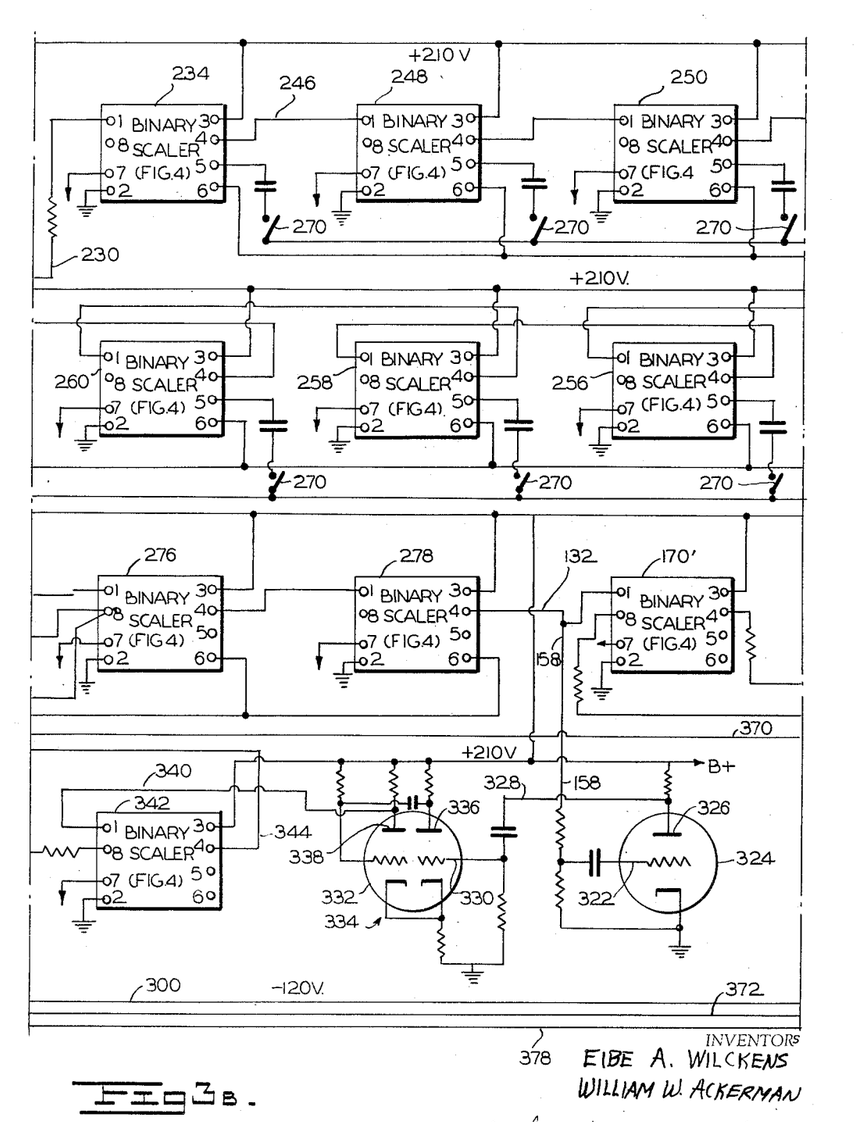
Figure 3C:
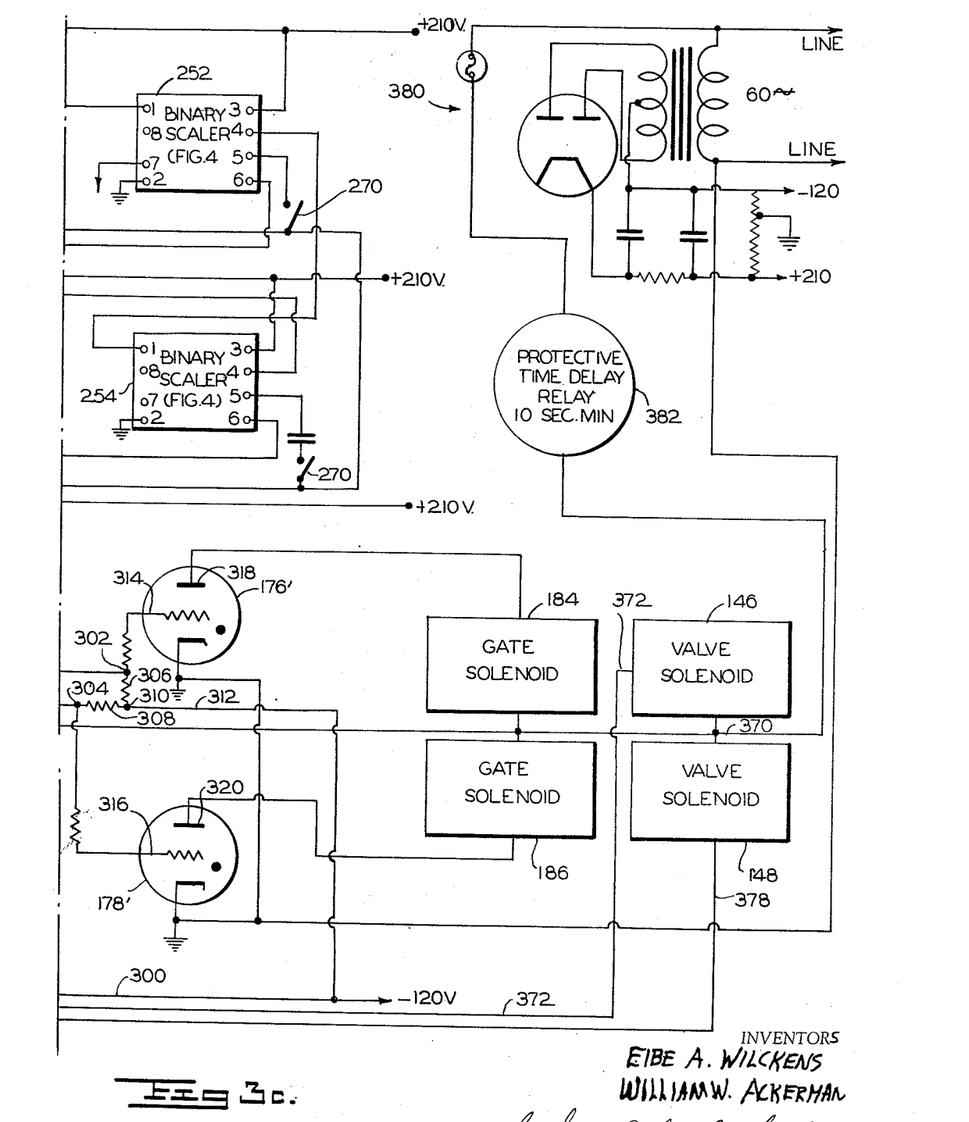

Figures 3A–3C are so drawn that with the three sheets arranged side by side with Figure 3A on the left, 3B in the center and 3C at the right the lines extending to the left and right from Figure 3B will directly interconnect with the corresponding lines on Figures 3A and 3C.

Figure 4:
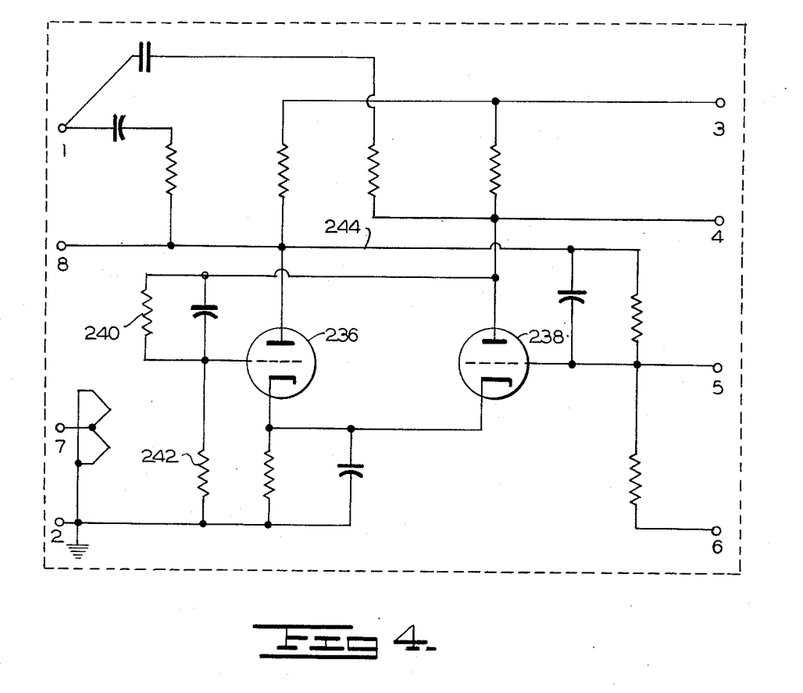
Figure 4 shows a schematic diagram of an electronic circuit unit employed in blocks marked by legend in Figures 3A–3C.

The circuit shown in Figure 4 is a binary scaler circuit employed in the circuit of Figures 3A–3C. Each use of the circuit of Figure 4 in Figures 3A–3C is designated by appropriate legend in the latter figures. The circuit of Figure 4 is provided with eight terminals designated by numerals 1 through 8. These terminals are similarly noted on each of the blocks in Figures 3A–3C and in similar position.

Referring now primarily to Figures 2 and 3A, the photocell and light circuit 110 and the shaker circuit 114 may be conveniently termed a photoelectric pick up section. As illustrated in Figure 3A this section comprises a vacuum-type photoelectric cell 210, a triode 212 employed as a cathode follower, one-half of a dual triode 214 used as an inverter and an asymmetrical multivibrator circuit designated generally as 216. The function of these units is to produce the shaped input pulse on line 116 of Figure 2. In operation, a cap interrupting the light beam at 36 in Figure 1 causes a decrease in conduction through the photoelectric cell 210 and produces a negative potential swing at point 218 in the cathode circuit of the photoelectric cell. Point 218 is connected to the grid 220 of triode 212 and a corresponding negative swing appears at point 222 in the cathode circuit of this tube. This potential swing is applied over line 224 to the left hand grid 226 of dual triode 214 and the result is a positive swing of the anode 228 of tube 214. The anode 228 is connected over a line 230 with the input line 232 of the multi-vibrator 216 and this positive swing triggers the multi-vibrator so that it produces a negative peaked pulse, preferably of about 0.5 microsecond rise time on the line 230. As will be observed in Figure 3A the multi-vibrator 216 is of the "one-shot" type and the duration of the pulse may be adjusted to be well within the time interval to be expected between interruptions of the light beam at 36 in Figure 1.

The line 230 is also connected to the No. 1 terminal of a first binary scaler circuit 234 and the negative pulse on line 230 will cause the scaler circuit 234 to be altered from one of its bi-stable conditions to the other. However, the positive pulse which first appeared on line 230 will not produce a transition in the circuit 234.

Binary scaling circuits are now well known to those skilled in the electronic art and are commercially available as plug-in units. However, for purposes of clarity, a representative circuit is shown in Figure 4 for use as circuit 234 and for other binary scaling circuits elsewhere illustrated in the drawings and mentioned hereinbelow.

Referring now to Figure 4, the binary scaling circuit comprises two triode tubes 236 and 238. These triodes may be actually the two sections of a dual triode if desired. The circuit is further characterized by provision of terminals numbered 1 through 8. Terminal No. 1 is for the trigger input, No. 2 is for connection to ground, No. 3 is for B+, No. 4 is for the output pulse, No. 5 is for feedback input and presetting, No. 6 is for resetting, No. 7 is for filament supply, and No. 8 is for feedback output. As will be well understood by those skilled in the art the sequence of operation is as follows: Assuming that tube 238 is conducting, a negative trigger pulse on terminal 1 drives the grid of 238 beyond cut off. The rise of anode potential of tube 238 is applied across the voltage divider network consisting of resistors 240 and 242 in the grid circuit of tube 236 thereby causing tube 236 to conduct. However, this causes a drop of anode potential in tube 236 and this is applied to the grid of tube 238 over the line 244. The drop in grid voltage at tube 238 causes the action to continue and build up until tube 238 is cut off and tube 236 is conducting. However, another negative triggering pulse appearing at terminal 1 will cause the same sort of action but leave tube 238 conducting and tube 236 cut off.

The action of the circuit of Figure 4 as regards the use of terminals 4, 5 and 8 will be described hereinbelow. The use of terminal 7 is obvious.

Referring again to circuit 234 in Figure 3B, the negative input pulse at terminal No. 1 of this circuit will produce a negative output pulse at terminal No. 4 and this is applied over line 246 to terminal No. 1 of a second binary scaling circuit 248, this circuit again being that shown in Figure 4. The sequence of connections from output terminals No. 4 to input terminals No. 1 is continued through binary scaling circuits designated 250, 252, 254, 256, 258, 260, 262, and 264, this being ten units. The output of the tenth binary scaling circuit No. 264 is the output line of the binary scaler counting circuit 118 in Figure 2 and the line leading from terminal 4 of circuit 264 is accordingly designated 120 to correspond with Figure 2.

The line in Figure 3A leading to the presetting circuit (122 of Figure 2) is connected with line 120 and is designated in Figure 3A as 120′. This line is coupled to the second grid 266 of the dual triode 214 and the negative pulse appearing on grid 266 produces a positive pulse at the associated anode 268. The positive pulse at anode 268 is then connected to a presetting line designated 124 to correspond to the similar line in Figure 2.

Connected to line 124 are ten on-off switches 270 there being one such switch for each of the binary scaler circuits mentioned above. Connected to the contact of switches 270 are coupling capacitances 272 which serve to couple the line 124 to the No. 5 terminals of the above-mentioned binary scaler circuits whenever a particular switch 270 is closed.

The switches 270 and the coupling to the No. 5 terminals permits the positive pulse at anode 268 of tube 214 to preset the ten unit counting circuits to a predetermined binary number. This is carried out in the following manner: If a given switch 270 is closed then the positive pulse available on line 124 will be applied in each case to the terminal No. 5 of the circuit of Figure 4. As will be clear from the circuit in Figure 4, this pulse will establish conduction in tube 238 if the tube is not already conducting. However, if tube 238 already is conducting, the positive pulse on terminal 5 will not cause a transition in the circuit. Accordingly, if it be assumed that switches 270 when closed indicate a binary "1" and open switches indicate a binary "0" the arrangement of switches 270 in a permutation according to a desired binary number will result in the presetting of the counting circuit comprising the above mentioned binary scalers upon the occurrence of the pulse on line 124.

The output terminal No. 4 of binary scaler 264 is also connected over line 128, corresponding to line 128 in Figure 2 as the input to terminal No. 1 of a binary scaler circuit 272. Scaler circuit 272 is connected with additional scaler circuits 274 and 276 and 278 to form the decade unit counter 130 of Figure 2. The interconnections of these scaler circuits are from output terminals No. 4 to input terminals No. 1 as above. The output at terminal No. 4 of scaler circuit 278 is connected to line 132 corresponding to the line 132 in Figure 2.

As above mentioned in connection with Figure 2, there are two uses for the pulses appearing on line 128 and the first, which will now be described, is the actuation of the shake timer circuit 134 of Figure 2. In Figure 3A the shake timer circuit comprises an asymmetrical or one-shot multi-vibrator designated generally as 280 and the input for this circuit is obtained over line 282 connected with the anode 268 of dual tube 214. That is, the positive pulse which was applied over line 124 to the various presetting switches 270 is also available at the left hand grid 284 of dual triode 286 of multi-vibrator circuit 280 to trigger the multi-vibrator. The occurrence of a pulse at 284 will shift conduction in the tube from the right hand anode 288 to the left hand anode 290. A rise in potential at grid 284 will result and this increased potential will remain until the RC factor of the circuit has permitted conduction to reshift to the right hand side of the tube 286. During this delay time a positive enabling potential will appear on line 136—corresponding to line 136 in Figure 2—connected with the anode 288. The line 136 is coupled as at junction 292 to the grids 294 and 296 of two thyratron tubes designated 138′ and 140′. These tubes are so designated to correspond to the thyratron switch circuits 138 and 140 of Figure 2. For reasons which will become fully apparent below, the junction 292 is also coupled through a high resistance 298 over a line 300 to a source of negative biasing potential. The resistance 298 serves to provide positive series control of the just mentioned thyratrons together with other thyratrons to be mentioned below.

It will be recalled that line 158 in Figure 2 carries the output pulse of the decade unit counter 130 and this pulse serves to trigger the electronic switch circuit 170. In Figure 3B circuit 170 is in the form of a binary scaler circuit such as that shown in Figure 4 and is designated 170'. The output terminal No. 4 of circuit 170' is connected to a junction 302 and the feedback output terminal No. 8 is connected to a junction 304. Extending between the junctions 302 and 304 are voltage divider resistances 306 and 308, the common junction 310 of these resistances being connected over line 312 to the previously mentioned source of negative bias potential. The junction 302 is then coupled to grid 314 of a thyratron tube 176' and the junction 304 is coupled to the grid 316 of a thyratron tube 178'. These thyratron tubes are so designated to correspond to the thyratron switch circuits 176 and 178 in Figure 2. Reference to Figure 4 shows that the potential on output terminal 4 will follow the anode potential of tube 238 and the potential on terminal 8 will follow the anode potential of tube 236. Therefore, in either position of the scaler circuit of Figure 4 terminal 4 will be at a relatively high potential and terminal 8 at a relatively lower potential or vice-versa. However, inasmuch as a relatively high negative potential is required to cut off a conducting thyratron, the plate potentials of the switch tubes are fed through the voltage divider which is tied at its central point to the fixed negative voltage.

The anodes 318 and 320 of thyratron tubes 176' and 178', respectively, are connected to the gate solenoids 184 and 186, respectively, as shown and discussed in connection with Figure 2.

Referring to Figure 3B, the input line 158 to shake hold-over time delay circuit 160 of Figure 2 is similarly here designated 158. Line 158 is first coupled to the grid 322 of a triode 324 employed as an inverter tube. The pulse on grid 322 derived from terminal 4 of binary scaler circuit 278 will be negative and accordingly, a positive pulse will appear on anode 326 of tube 324. Anode 326 is coupled over line 328 to the input grid 330 of a dual triode 332 employed in an asymmetrical or one-shot multi-vibrator designated generally as 334. The anode associated with grid 330 is designated 336 and the other anode of tube 332 is designated 338. Anode 338 is connected over line 340 with the No. 1 terminal of a binary scaler circuit 342 of the type illustrated in Figure 4. The action of the multi-vibrator 334 will be that the positive pulse on grid 330 will transfer conduction to anode 336. Accordingly, anode 338 will move to a relatively positive potential while conduction continues at anode 336. Then, upon completion of the time delay determined by the RC factor in the multi-vibrator circuit conduction will return to anode 338 and this anode will take a negative swing. This negative swing appearing on line 340 will trigger the binary scaler circuit 342 to move from whichever state it is in to the other. Terminal No. 4 of binary scaler circuit 342 is connected over line 344 to the midpoint junction 346 of voltage divider comprising resistors 348 and 350. The end of resistor 350 opposite the junction 346 is then connected with the previously mentioned source of negative bias potential on line 300.

The junction 346 is coupled with the grid 352 of a thyratron tube 154'. The anode 356 of tube 154'—corresponding to thyratron switch circuit 154 in Figure 2—is connected over line 358 with the cathode 360 of previously mentioned thyratron tube 138'. In similar fashion the output terminal No. 8 of scaler circuit 342 is coupled to the grid 362 of thyratron tube 156'—corresponding to thyratron switch circuit 156 of Figure 2—and the anode 364 of this tube is connected over line 366 to the cathode 368 of thyratron tube 140'. Accordingly, it will be clear that the thyratron tubes 138' and 154' are in series and the thyratron tubes 140' and 156' in series. This is according to the description of Figure 2.

The valve solenoids 146 and 148 are shown in Figure 3C and it will be noted that these solenoids have a common connection to a line 370 which is connected to one side of a conventional power line. A circuit may be traced from line 370 through valve solenoid 146 and thyratron tubes 138' and 154' as follows: Solenoid 146 is connected over line 372 to the anode 374 of thyratron tube 138'. If grid 294 is momentarily biased to permit conduction in tube 138' anode 374 will then connect over line 358 with the anode 356 of thyratron tube 154' and when grid 352 is biased to permit conduction the circuit will proceed to ground at the cathode 376 of tube 154'. Inasmuch as the side of the supply line opposite that side connected to line 370 is grounded as at the cathode of thyratron tube 178', the circuit through valve solenoid 146 and tubes 138' and 154' will be completed. This meets the requirement as set out in the discussion of Figure 2. A similar circuit may be traced through valve solenoid 148 over line 378, through tube 140' and then through tube 156' to ground.

As an alternative arrangement, the dual function of two thyratrons in series may be obtained by providing a single tube having two control electrodes operated as are grids 294 and 352, for example.

A conventional full wave rectifier designated generally as 380 is employed to provide the required positive and negative direct current potentials for use where indicated in Figures 3A–3C. A protective time delay relay 382 is also provided for preventing the application of alternating current power until the power supply has begun to function.

If desired, each counting stage may have an associated neon lamp to indicate the count progression as will be well understood by those skilled in the art. Each lamp when lighted will indicate one of the following series of numbers in the binary progression 1— 2— 4— 8— 16— 32— 64— 128— 256— 512—. The sum of any combination of these numbers at any instant represents the total count. When all lamps are on the total is 1023. To preset any desired count within this range the switches associated with the complement of the desired number minus 1024 are thrown to their "on" position. For example, to count to 720 this number is subtracted from 1024 and the difference (304) is preset. Since 304 does not exist as a single indication a combination which totals 304 will be preset as follows: 16 on, 32 on, 256 on. The preset total is thus 304. Therefore, the circuit will count from 304 to 1024 continually or until a new combination is preset.

From the foregoing it will be apparent that by the present invention the desired sequence of control function is performed by electronic circuits which can function very rapidly and therefore count the output of any mechanical system for forming the flow of articles for interrupting the light beam.

The system according to the invention is capable of responding to input impulses which occur at rates up to 150 thousand cycles per second. It will be understood that while a given number of counting stages in the circuits 118 and 130 of Figure 2 has been presented the number of these counting stages can be increased or altered indefinitely to give various other capacities.

The particular advantages of the invention over known devices is that practically all electromagnetic controls have been eliminated, the complete sequence of operation is automatically controlled, the system is adaptable to any sequence of counting from 1 to a very large number, the bulk and volume of the entire instrument can be much less than any known device producing similar functions and the circuit design of presetting and thyratron control networks are much more simple and reliable than other known means of producing similar functions.

It is to be understood that the foregoing detailed description has been made only for purposes of illustration and is not intended to limit the scope of the invention. On the contrary, the scope of the invention is to be determined from the appended claims.

We claim:

1. In article handling apparatus, means for assembling articles into a flow line, means for counting the articles as they move in the flow line to generate a first count manifestation and also predetermined submultiple count manifestations upon the passing of predetermined numbers of articles, means for selectively guiding the flow of articles to one of at least two receptacle retaining units for filling retained receptacles, means for operating the guiding means, the guide operating means being responsive to the first predetermined count manifestation of the counting means to divert the flow of articles to another receptacle unit, means interconnected with each receptacle unit for manipulating the units to settle articles in the receptacles, and means responsive to the first and also to the predetermined sub-multiple count manifestations of the counting means for operating the settling means of the receptacle units.

2. In article handling apparatus, means for assembling articles into a flow line, means for counting the articles as they move in the flow line to generate a count manifestation upon the passing of a predetermined number of articles, means for selectively guiding the flow of articles to one of at least two receptacle retaining units for filling retained receptacles, means for operating the guiding means, the guide operating means being responsive to the count manifestation of the counting means to divert the flow of articles to another receptacle unit, means interconnected with each receptacle unit for manipulating the units to settle articles in the receptacles, means for operating the settling means of the receptacle to which the articles are being directed, the settling operating means being arranged to provide a final settling period to the receptacle unit to which the articles have been directed following diversion of the flow of articles to another receptacle.

3. In article handling apparatus, means for assembling articles into a flow line, means for counting the articles as they move in the flow line to generate a first count manifestation and other count manifestations upon the passing of predetermined numbers of articles, means for selectively guiding the flow of articles to one of at least two receptacle retaining units for filling retained receptacles, means for operating the guiding means, the guide operating means being responsive to the first count manifestation of the counting means to divert the flow of articles to another receptacle unit, means interconnected with each receptacle unit for manipulating the units to settle articles in the receptacles, means responsive to the first and also to the other predetermined count manifestations of the counting means for operating the settling means of the receptacle to which the articles are being directed for predetermined intervals of time, the settling operating means being arranged to provide a final settling period to the receptacle unit to which the articles have been directed following diversion of the flow of articles to another receptacle.

4. In article handling apparatus having means for selectively guiding a flow of articles to at least two receptacles and means for sensing each passing article in the flow for counting purposes, first counting means responsive to the sensing means for producing electrical output pulses upon the occurrences of first predetermined counts, means connected with the first counting means and responsive to the said pulses for manipulating the receptacle to which articles are flowing upon the occurrence of each pulse to settle said articles, second counting means also connected with the first counting means and responsive to the output pulses thereof to produce output pulses upon the occurrence of a predetermined number of output pulses of the first counting means, and means connected to the second counting means and responsive to each output pulse thereof to operate the guiding means to divert the flow of articles to another receptacle.

5. In article handling apparatus having means for selectively guiding a flow of articles to at least two receptacles and means for sensing each passing article in the flow for counting purposes, first counting means responsive to the sensing means for producing electrical output pulses upon the occurrences of first predetermined counts, means connected with the first counting means and responsive to the said pulses for manipulating the receptacle to which articles are flowing upon the occurrence of each pulse to settle said articles, second counting means also connected with the first counting means and responsive to the output pulses thereof to produce output pulses upon the occurrence of a predetermined number of output pulses of the first counting means, means connected to the second counting means and responsive to each output pulse thereof to operate the guiding means to divert the flow of articles to another receptacle, and means interconnected with the manipulating means and the second counting means for providing a final manipulation of the receptacle to which articles have been directed following the diversion of articles to another receptacle.

6. Apparatus as in claim 5 wherein the manipulating means comprises discharge device means having first and second control electrodes, the first control electrode being connected to a time delay circuit connected to the first counting device, and the second control electrode being connected to an electronic switch included in the means for providing the said final manipulation.

7. Apparatus as in claim 5 wherein the manipulating means comprises a control channel for each receptacle, each channel comprising discharge means having first and second control electrodes, the first control electrode of each channel being connected to a time delay circuit connected to the first counting device, and the second control electrode of each channel being connected to an electronic switch included in the means for providing the said final manipulation.

8. Apparatus as in claim 5 wherein the manipulating means comprises first and second electrical discharge devices connected in series, each discharge device having a control electrode, the control electrode of the first device being connected to a time delay circuit connected to the first counting device, and the control electrode of the second device being connected to an electronic switch included in the means for providing the said final manipulation.

9. Apparatus as in claim 5 wherein the manipulating means comprises a control channel for each receptacle, each channel comprising first and second electrical discharge devices connected in series, each discharge device having a control electrode, the control electrode of the first device of each channel being connected to a time delay circuit connected to the first counting device, and the control electrode of the second device of each channel being connected to an electronic switch included in the means for providing the said final manipulation.

References Cited in the file of this patent

UNITED STATES PATENTS

| | | |
|---|---|---|
| 2,204,126 | Domke | June 11, 1940 |
| 2,304,982 | Wilckens | Dec. 15, 1942 |
| 2,523,517 | Potter | Sept. 26, 1950 |